United States Patent
Dintenfass

(10) Patent No.: US 11,080,091 B2
(45) Date of Patent: Aug. 3, 2021

(54) SYSTEM FOR REAL TIME PROVISIONING OF RESOURCES BASED ON CONDITION MONITORING

(71) Applicant: Bank of America Corporation, Charlotte, NC (US)

(72) Inventor: Katherine Dintenfass, Lincoln, RI (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 172 days.

(21) Appl. No.: 16/267,730

(22) Filed: Feb. 5, 2019

(65) Prior Publication Data
US 2020/0249993 A1 Aug. 6, 2020

(51) Int. Cl.
G06F 9/50 (2006.01)
G06F 21/62 (2013.01)
G06N 20/00 (2019.01)

(52) U.S. Cl.
CPC ............ G06F 9/5011 (2013.01); G06F 21/62 (2013.01); G06N 20/00 (2019.01)

(58) Field of Classification Search
CPC ............................... G06F 9/5011; G06F 21/62
See application file for complete search history.

(56) References Cited

U.S. PATENT DOCUMENTS

| | | | |
|---|---|---|---|
| 101,737 A | 4/1870 | Jenkins | |
| 6,236,975 B1 | 5/2001 | Boe et al. | |
| 7,330,850 B1 | 2/2008 | Seibel et al. | |
| 7,631,096 B1 | 12/2009 | Yeh et al. | |
| 7,734,641 B2 | 6/2010 | Kanigsberg et al. | |
| 7,860,961 B1 | 12/2010 | Finkelstein et al. | |
| 7,953,903 B1 | 5/2011 | Finkelstein et al. | |
| 8,089,875 B2 | 1/2012 | Fraccalvieri et al. | |
| 8,301,514 B1 | 10/2012 | Vippagunta | |
| 8,417,584 B2 | 4/2013 | Ross | |
| 8,537,845 B2 | 9/2013 | Waldrop et al. | |
| 8,572,072 B1 | 10/2013 | Roumeliotis | |
| 8,782,076 B2 | 7/2014 | Rothman et al. | |
| 8,868,725 B2 | 10/2014 | Samba | |
| 9,251,033 B2 | 2/2016 | Kirchhofer | |
| 9,311,386 B1 | 4/2016 | Song et al. | |

(Continued)

OTHER PUBLICATIONS

Deshpande et al. Selective Markov Models for Predicting Web Page Accesses. (May 2004) [online] ACM., pp. 163-184. Retrieved From the Internet <https://dl.acm.org/doi/pdf/10.1145/990301.990304> (Year: 2004).*

(Continued)

*Primary Examiner* — Hiren P Patel
*Assistant Examiner* — Jonathan R Labud
(74) *Attorney, Agent, or Firm* — Michael A. Springs; Moore & Van Allen PLLC; Seongun M. Hong

(57) ABSTRACT

Embodiments of the present disclosure provide a system for real time provisioning and optimization of a user's resources based on both historical and real time data associated with the user. In particular, the system may comprise a data analytics engine which may continuously analyze user data from various data sources. The aggregated data may be processed through a predictive engine which may use artificial intelligence and/or machine learning to predict a user's actions within the system. Based on the prediction, the system may provide an optimized allocation of resources with respect to the predicted actions of the user.

14 Claims, 2 Drawing Sheets

(56) References Cited

U.S. PATENT DOCUMENTS

| | | |
|---|---|---|
| 9,503,549 B2 | 11/2016 | Radhakrishnan et al. |
| 9,672,283 B2 | 6/2017 | Pappas et al. |
| 9,710,821 B2 | 7/2017 | Heath |
| 9,767,182 B1 | 9/2017 | Thakur et al. |
| 9,929,923 B2 | 3/2018 | Heinz et al. |
| 2006/0205413 A1* | 9/2006 | Teague .................. H04W 72/04 455/452.1 |
| 2010/0036722 A1* | 2/2010 | Cavander ........... G06Q 30/0246 705/14.13 |
| 2013/0262366 A1* | 10/2013 | Hjelm ...................... G06N 5/04 706/50 |
| 2014/0143324 A1* | 5/2014 | Lessin .................... G06F 16/13 709/204 |
| 2015/0371023 A1* | 12/2015 | Chen ...................... G06N 20/00 706/12 |
| 2017/0011444 A1 | 1/2017 | Greystoke et al. |
| 2017/0063953 A1* | 3/2017 | Niewczas ............... H04L 67/18 |
| 2017/0124573 A1* | 5/2017 | Hall ...................... G06Q 30/018 |
| 2018/0040020 A1* | 2/2018 | Kurian ................ G06F 16/9535 |
| 2018/0276710 A1 | 9/2018 | Tietzen et al. |

OTHER PUBLICATIONS

Michael Milford et al.; The Conversation, dated Aug. 30, 2018; retrieved from the internet at http://theconversation.com/when-ai-meets-your-shopping-experience-it-knows-what-you-buy-and-what-you-ought-to-buy-101737 on Feb. 4, 2019.

Orpheus Data Categorizer; Use Artificial Intelligence in Procurement; retrieved from the internet on Feb. 4, 2019 at https://www.orpheus-it.com/big-data/artificial-intelligence-in-procurement; Orpheus GmbH 2019.

* cited by examiner

SYSTEM FOR REAL TIME PROVISIONING OF RESOURCES BASED ON CONDITION MONITORING

BACKGROUND

In the data analytics context, there is a need for an efficient way to provision resources in real time to optimize resource allocation on behalf of the user.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present disclosure address the above needs and/or other needs by providing a system for real time provisioning and optimization of a user's resources based on both historical and real time data associated with the user. In particular, the system may comprise a data analytics engine which may continuously analyze user data from various data sources. The aggregated data may be processed through a predictive engine which may use artificial intelligence and/or machine learning to predict a user's actions within the system. Based on the prediction, the system may provide an optimized allocation of resources with respect to the predicted actions of the user.

Accordingly, embodiments of the present disclosure provide a system for real time provisioning of resources based on condition monitoring. The system may comprise a memory device with computer-readable program code stored thereon; a communication device; and a processing device operatively coupled to the memory device and the communication device. The processing device may be configured to execute the computer-readable program code to continuously collect, via a data analytics engine, user data associated with a user from a user computing device; construct a user profile associated with the user based on the user data; predict, via a predictive engine, that a user intends to take a first action; generate a resource allocation projection associated with the first action; and transmit the resource allocation projection to the user computing device.

In some embodiments, generating the resource allocation projection further comprises transmitting the user profile to one or more third party computing devices; receiving, from the one or more third party computing devices, additional data associated with the first action; and incorporating the additional data into the resource allocation projection.

In some embodiments, the processing device is further configured to execute the computer-readable program code to, based on the user profile, perform a validation check on the first action.

In some embodiments, the processing device is further configured to execute the computer-readable program code to detect that the validation check has failed; and based on detecting that the validation check has failed, determine that the user does not intend to take the first action.

In some embodiments, the processing device is further configured to execute the computer-readable program code to detect that the validation check has succeeded; and increase a confidence level that the user intends to take the first action.

In some embodiments, the processing device is further configured to execute the computer-readable program code to adjust predictions based on machine learning.

In some embodiments, the user data comprises biographical data, behavior data, historical data, and device data.

Embodiments of the present disclosure also provide a computer program product for real time provisioning of resources based on condition monitoring, the computer program product comprising at least one non-transitory computer readable medium having computer-readable program code portions embodied therein, the computer-readable program code portions comprising executable code portions for continuously collecting, via a data analytics engine, user data associated with a user from a user computing device; constructing a user profile associated with the user based on the user data; predicting, via a predictive engine, that a user intends to take a first action; generating a resource allocation projection associated with the first action; and transmitting the resource allocation projection to the user computing device.

In some embodiments, generating the resource allocation projection further comprises transmitting the user profile to one or more third party computing devices; receiving, from the one or more third party computing devices, additional data associated with the first action; and incorporating the additional data into the resource allocation projection.

In some embodiments, the computer-readable program code portions further comprising executable code portions for performing a validation check on the first action.

In some embodiments, the computer-readable program code portions further comprising executable code portions for detecting that the validation check has failed; and based on detecting that the validation check has failed, determining that the user does not intend to take the first action.

In some embodiments, the computer-readable program code portions further comprising executable code portions for detecting that the validation check has succeeded; and increasing a confidence level that the user intends to take the first action.

In some embodiments, the user data comprises biographical data, behavior data, historical data, and device data.

Embodiments of the present disclosure also provide a computer-implemented method for real time provisioning of resources based on condition monitoring. The method may comprise continuously collecting, via a data analytics engine, user data associated with a user from a user computing device; constructing a user profile associated with the user based on the user data; predicting, via a predictive engine, that a user intends to take a first action; generating a resource allocation projection associated with the first action; and transmitting the resource allocation projection to the user computing device.

In some embodiments, generating the resource allocation projection further comprises transmitting the user profile to one or more third party computing devices; receiving, from the one or more third party computing devices, additional data associated with the first action; and incorporating the additional data into the resource allocation projection.

In some embodiments, the method further comprises performing a validation check on the first action.

In some embodiments, the method further comprises detecting that the validation check has failed; and based on detecting that the validation check has failed, determining that the user does not intend to take the first action.

In some embodiments, the method further comprises detecting that the validation check has succeeded; and increasing a confidence level that the user intends to take the first action In some embodiments, the method further comprises adjusting predictions based on machine learning.

In some embodiments, the user data comprises biographical data, behavior data, historical data, and device data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
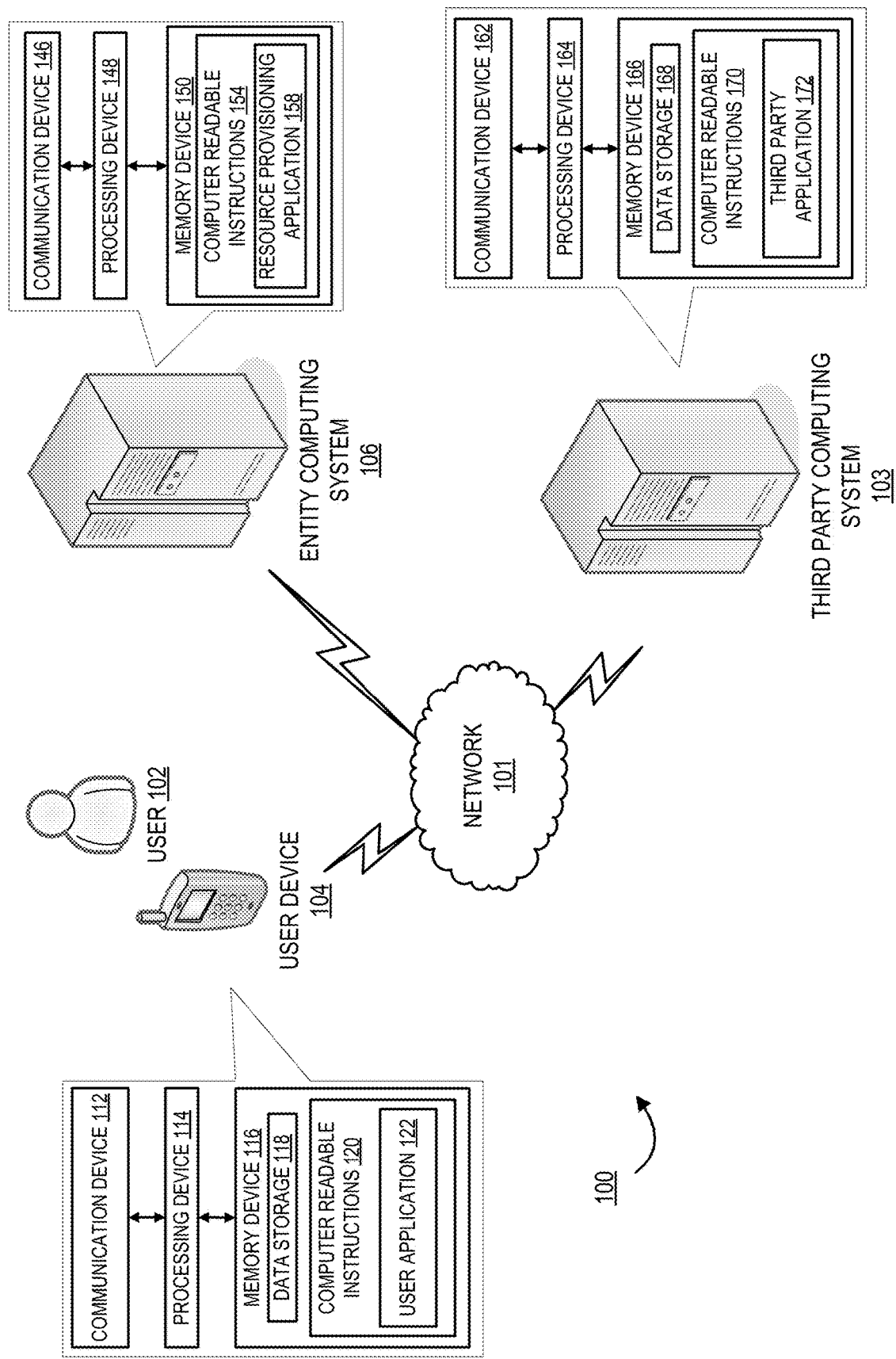
Figure 2:
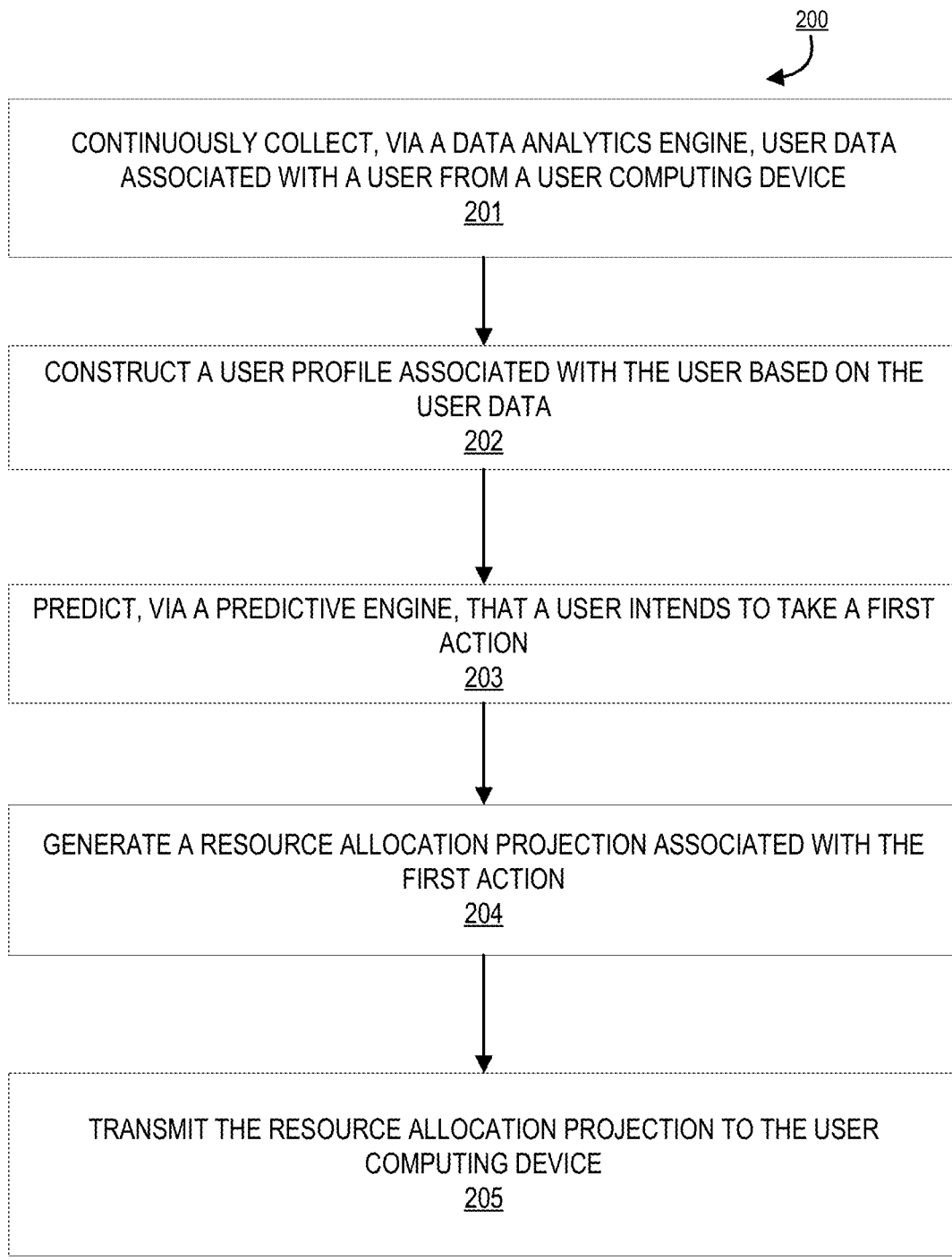

Having thus described embodiments of the invention in general terms, reference will now be made to the accompanying drawings, wherein:

FIG. 1 illustrates an operating environment for the real time resource provisioning system, in accordance with one embodiment of the present disclosure; and FIG. 2 illustrates a process flow for the real time resource provisioning system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Resource" as used herein may refer to an object under the ownership of a user which is stored or maintained by the entity on the user's behalf. The resource may be intangible or tangible objects such as data files, documents, biographical data, funds, and the like. Typically, the user's account contains records of the resources owned by the user. Account data may be stored in an account database within the entity's systems.

"Service" as used herein includes any task, labor, product, or the like provided to a user from the entity or a third party service provider.

The entity system as described herein may, in order to execute various processes to provide resource prioritization and optimization functions, continuously collect data associated with a user. In this regard, the system may comprise a data analytics engine which collects said data from various data sources, such as user-owned computing systems (e.g., desktop computer, mobile phone, portable smart device, or the like). The collected data may include user and/or device location data, internet browsing data, activity level data (e.g., frequency and/or length of device usage), date and time data, user account and/or resource data, or the like.

Based on the data collected by the data analytics engine, the system may, through a predictive engine, predict that a user is preparing or intends to perform one or more actions relating to an objective of the user. The predictive engine may comprise machine learning components which use negative and/or positive reinforcement to use real-time data to actively develop a profile of the user. Based on predicting the user's actions, the system may generate one or more information models or projections for resource provisioning to be transmitted to the user to facilitate the user's performance of the action. In some embodiments, the entity system may further be configured to share the data associated with the user with one or more third party systems, which may contribute supplementary data to be used in the information models and/or projections generated by the entity system.

In some embodiments, the system may further comprise a data filtering engine which may identify certain data points associated with the user that may influence (e.g., increase or decrease) the confidence level of the certainty to which the user intends to perform the one or more actions. For instance, based on user data such as biographical data, Internet browsing data, location data, or the like, the system may generate a user profile associated with the user. If the predicted action of the user contradicts or is inconsistent with the user profile associated with the user, the system may decrease the confidence level associated with the predicted action (e.g., the system may apply negative data filtering). On the other hand, if the predicted action supports or is consistent with the user profile, then the system may increase the confidence level associated with said predicted action (e.g., the system may apply positive data filtering). For instance, if the user has visited a particular location which provides a particular service (e.g., a nursing home), but the user's profile and/or biographical data is inconsistent with the service provided by said location (e.g., the user is too young to personally receive the service), then the system may determine that the user's purpose for the visit is for a reason other than to personally receive the service (e.g., the user has visited the location to provide adult care to another third party).

The system as described herein confers a number of technological advantages over methods involving conventional methods of resource provisioning and predictive modeling. In particular, by using real-time data analytics to track data associated with the user, the system is able to provide up-to-date projections and/or resource allocation models on an ongoing basis. Furthermore, by using positive and/or negative data filtering, the system is able to reduce the incidence of false positives and/or negatives of the predictive engine, which in turn prevents computing resource inefficiencies of the entity system.

The following example is an exemplary use case of the real-time provisioning system as described herein. It should be understood that the following example is provided for illustrative purposes and is not intended to restrict the scope of the disclosure to the described embodiment. In one embodiment, the system may continuously collect data from the user regarding key moments or decisions within the user's life. For instance, the system may, by monitoring and continuously collecting said data, detect that user may be in the process of preparing to purchase a new automobile. The system may make said determination based on the user's Internet browsing history, location history, electronic communications or correspondence, or the like. For example, the system may detect that the user has been researching automobile specifications and/or pricing information online, has been visiting auto dealerships based on location data, has been communicating with dealers (e.g., via e-mail) regarding certain vehicles, or the like.

Based on collecting the data as described above, the system may calculate a confidence level which reflects the probability or likelihood of the user taking a particular action with respect to the user's goal (e.g., purchase a selected vehicle). For example, the system may determine, based on the user's historical data and real-time data, that the user has completed the research phase of the process and is ready to purchase a vehicle (e.g., the user has walked into a dealership with the intent of purchasing a vehicle). In such embodiments, the system may generate a projection for resource provisioning which may contain various types of information that may be relevant to the user's completion of the transaction. For instance, the system may provide vehicle comparison data (e.g., technical specifications, fuel efficiency data, or the like), financial information (e.g., pricing, loan terms, ancillary costs, or the like), maintenance forecasts (e.g., oil change schedules, parts replacement schedules, or the like), or other types of data that may aid the user in optimally allocating resources to accomplishing the user's objectives.

In some embodiments, the entity system may access third party servers to obtain additional data to be sent to the user to further aid the resource allocation process. For instance, continuing the previous example, the entity system may receive bids from downstream third parties related to the procurement and/or maintenance of the vehicle (e.g., vehicle dealers, mechanics, replacement parts suppliers, maintenance service providers, insurance providers, or the like) to provide products, services, and/or support to the user in completing the desired action (e.g., procuring the vehicle). In this way, the system may provide the user with projections containing relevant data with respect to certain actions taken in furtherance of the user's objectives while simultaneously reducing the incidence of irrelevant data being provided to the user. Thus, the system provides an efficient way to provide resource allocation projections to the user.

Turning now to the figures, FIG. 1 illustrates an operating environment 100 for the real-time resource provisioning system, in accordance with one embodiment of the present disclosure. In particular, FIG. 1 illustrates an entity computing system 106 that is operatively coupled, via a network 101 to a user device 104 and/or an third party computing system 103. In such a configuration, the entity computing system 106 may transmit information to and receive information from the user device 104 and/or the third party computing system 103. It should be understood that FIG. 1 illustrates only an exemplary embodiment of the system environment 100, and it will be appreciated that in other embodiments one or more functions of the systems, devices, or servers as depicted in FIG. 1 may be combined into a single system, device, or server. In other embodiments, a single system, device, or server as depicted in FIG. 1 may represent multiple systems, devices, or servers.

The network 101 may be a system specific distributive network receiving and distributing specific network feeds and identifying specific network associated triggers. The network 101 include one or more cellular radio towers, antennae, cell sites, base stations, telephone networks, cloud networks, radio access networks (RAN), WiFi networks, or the like. Additionally, the network 101 may also include a global area network (GAN), such as the Internet, a wide area network (WAN), a local area network (LAN), or any other type of network or combination of networks. Accordingly, the network 101 may provide for wireline, wireless, or a combination wireline and wireless communication between devices on the network 101.

The user device 104 may be a device which is owned and/or operated by a user 102. The user device 104 may be, for example, a portable device such as a cellular phone, smart phone, smart device, personal data assistant (PDA), laptop, or the like, though it is within the scope of the disclosure for the user device 104 to be a stationary device such as a desktop computer. The user device 104 generally comprises a communication device 112, a processing device 114, and a memory device 116. The processing device 114 is operatively coupled to the communication device 112 and the memory device 116. The processing device 114 uses the communication device 112 to communicate with the network 101 and other devices on the network 101, such as, but not limited to the entity computing system 106. As such, the communication device 112 generally comprises a modem, antennae, WiFi or Ethernet adapter, radio transceiver, or other device for communicating with other devices on the network 101.

The user device 104 comprises computer-readable instructions 120 and data storage 118 stored in the memory device 116, which in one embodiment includes the computer-readable instructions 120 of a user application 122. In some embodiments, the user application 122 allows a user 102 to receive communications from and/or send communications to the entity computing system 106 and/or the third party computing system 103. For instance, the user application 122 may allow the user 102 to access the third party computing system 103 and perform customization of the third party application 172 stored therein and/or perform various other configuration, management, and/or tracking functions as described elsewhere herein.

As further illustrated in FIG. 1, the entity computing system 106 may comprise a communication device 146, a processing device 148, and a memory device 150. The entity computing system 106 may be owned and/or operated by an entity such as an Internet service provider, financial institution, business organization, or the like. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the user device 104 and/or the third party computing system 103 generally comprises a modem, antennae, WiFi or Ethernet adapter, radio transceiver, or other device for communicating with other devices on the network 101.

As further illustrated in FIG. 1, the entity computing system 106 comprises computer-readable instructions 154 stored in the memory device 150, which in one embodiment includes the computer-readable instructions 154 of a resource provisioning application 158. In some embodiments, the memory device 150 includes data storage 152 for storing data related to the system environment, but not limited to data created and/or used by the resource provisioning application 158. The resource provisioning application 158 may comprise computer-executable program code which may instruct the processing device 148 to perform certain logic, data processing, and data storing functions of the application to accomplish the entity's objectives. For example, the resource provisioning application 158 may allow the entity to query, track, configure, or perform other types of communicative functions with the user device 104 and/or the third party computing system 103.

In some embodiments, the operating environment may comprise one or more third party computing systems 103. The third party computing system 103 may refer to a computing system which may be owned and/or operated by a third party, such as a server or database. Accordingly, the third party computing system 103 may also comprise a processing device 164 operatively coupled to the communication device 162 and a memory device 166 comprising data storage 168 and computer readable instructions 170. The computer readable instructions 170 may comprise an third party application 172 which may be configured to instruct the processing device 164 to execute certain functions over the network 101, such as interacting with the entity computing system 106 and/or the user device 104.

The communication device 162, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the third party computing system 103 may also include a communication interface device that may be connected by a hardwire connection to the resource distribution device. The interface device may comprise a connector such as a USB, SATA, PATA, SAS or other data connector for transmitting data to and from the respective computing system.

The user device 104 and the third party computing system 103 may each further include a processing device communicably coupled to devices as a memory device, output devices, input devices, a network interface, a power source, a clock or other timer, a camera, a positioning system device, a gyroscopic device, one or more chips, and the like.

In some embodiments, the user device 104 and the third party computing system 103 access one or more databases or datastores (not shown) to search for and/or retrieve information related to the service provided by the entity. The user device 104 and the third party computing system 103 may also or alternatively access both a memory and/or datastore local to the user device 104 and/or the third party computing system 103.

The processing devices as described herein may include functionality to operate one or more software programs or applications, which may be stored in the memory device. For example, a processing device may be capable of operating a connectivity program, such as a web browser application. In this way, the user device 104 and/or the third party computing system 103 may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the user device 104 and/or the third party computing system 103. Alternatively, the applications may be pre-installed and stored in a memory in a chip.

The chip may include the necessary circuitry to provide integration within the devices depicted herein. Generally, the chip will include data storage which may include data associated with the service that the entity computing system 106, user device 104 and the third party computing system 103 may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the entity computing system 106, the user device 104 and/or the third party computing system 103 may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the user device 104 and/or the third party computing system 103 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 202, may include any of a number of devices allowing the devices to receive data from a user 202, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The user device 104 and/or the third party computing system 103 further comprise a gyroscopic device. The positioning system, input device, and the gyroscopic device may be used in correlation to identify phases within a service term.

In some embodiments, the user device 104 and/or the third party computing system 103 may identify the activity associated with a service. The user device 104 and/or the third party computing system 103 may do this via the gyroscopic device, positioning system device, camera, and the like. As such, the user device 104 and/or the third party computing system 103 may identify when a product is being used, how often it is being used, the phase of the service, and the like.

As described above, the user device 104 may be one or more of various types of "smart devices." For example, the user device 104 may be a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of IoT devices or smart devices provided herein is not exhaustive such that the user device 104 may be any device that includes a communication interface or module, software and/or hardware that allow the device to communicate data and/or information related to the device with other devices and/or systems over network.

User device 104 may also have a control system for controlling the physical operation of the device. The control system may comprise one or more sensors for detecting operating conditions of the various mechanical and electrical systems that comprise the user device 104 or of the environment in which the user device 104 is used. The sensors may communicate with the processing device to provide feedback to the operating systems of the device. The control system may also comprise metering devices for measuring performance characteristics of the user device 104. The control system may also comprise controllers such as programmable logic controllers (PLC), proportional integral derivative controllers (PID) or other machine controllers. The user device 104 may also comprise various electrical, mechanical, hydraulic or other systems that perform various functions of the user device 104. These systems may comprise, for example, electrical circuits, motors, compressors, or any system that enables functioning of the user device 104.

FIG. 2 illustrates a process flow 200 for real-time resource provisioning based on condition monitoring, in accordance with one embodiment of the present disclosure. The process may begin at block 201, where the system continuously collects, via a data analytics engine, user data associated with a user from a user computing device. In some embodiments, the system may also collect data from various third party systems and/or servers. Accordingly, the data may encompass various kinds of information associated with the user, such as biographic data (e.g., name, addresses, or the like), contemporaneous data (e.g., current location, time, trajectory and/or speed, current browsing activity, or the like), historical data (e.g., location history, internet browsing history, transaction history, or the like), financial data (e.g., account information, account balance, or the like), device data (computing device make or model, current device location, online status, or the like), and/or behavioral data (e.g., social media activity, contact lists, habit information, purchases, or the like), or other types of user-specific data.

The process continues to block 202, where the system constructs a user profile associated with the user based on the user data. By using the collected data, the system may generate a user profile which is updated continuously in real time based on the incoming data. By constructing a user profile in this way, the system is able to develop an accurate timeline of the life of the user. In an exemplary embodiment, the system may detect from the user-specific data (e.g., browsing history, location history, social media activity, or the like) that the user has been researching and preparing to purchase a vehicle.

The process continues to block 203, where the system predict, via a predictive engine, that a user intends to take a first action. By using the user profile and the timeline, the system may be able to predict that the user is ready to complete a step in accomplishing an objective of the user. Continuing the example, the system may detect, based on the current location and/or bearing of the user, that the user has entered a vehicle dealership. Based on the complete user profile and user timeline, the system may determine that the user intends to purchase the vehicle from the dealership.

In some embodiments, the system may use machine learning to improve the predictive engine based on the outcomes of the user's actions. For instance, based on whether the user actually takes the first action as predicted by the predictive engine, the system may make adjustments to the machine learning components (e.g., adjust input weights of neural networks) in order to ensure greater accuracy of predictions over time.

In some embodiments, the system may use various validation checks to compare the predicted action against the user profile to ensure consistency. For example, the system may compare the biographical information of the user to ensure that the action is consistent with the biographical information. To continue the example, the system may perform a validation check to ensure that the user meets the requirements to take the first action (e.g., purchase a vehicle). If the system detects that the validation check has failed (e.g., the user is not old enough to drive or purchase a vehicle), then the system may adjust the predictions that the user will take a certain action (e.g., determine that the user does not intend to take the first action). On the other hand, if the system detects that the user profile is consistent with the first action, then the system may be more certain that the user intends to take the first action (e.g., increase a confidence level of the first action).

The process continues to block 204, where the system generates a resource allocation projection associated with the first action. At this stage, the system may generate a projection which may show the user the optimum way to allocate resources to accomplish the first action. To continue the example in which the user wishes to purchase a vehicle, the resource allocation projection may include impacts on the user's financial accounts, financing options, purchase and/or financing terms, ancillary costs, legal and/or regulatory information, or the like.

In some embodiments, the system may be configured to transmit the user profile and/or the resource allocation projection to third party servers and/or computing systems to allow third parties to transmit additional data to be included in the resource allocation project. In this way, the system may recalculate the resource allocation projection based on the additional data provided by the third party. To continue the example, the system may transmit the user data to various third parties associated with the purchase, use, and/or maintenance of the vehicle (e.g., third parties that provide the vehicle itself, vehicle maintenance and/or repair services, vehicle parts, accessories, or the like). If the user data is provided to the dealer, for instance, the dealer may determine based on the user data that the user has a favorable financial profile, and thus may be willing to provide improved terms for the purchase of the vehicle. In some embodiments, the various third parties may further submit bids to provide goods and/or services with respect to the vehicle. Once the third parties have submitted bids, the system may incorporate information about the bids into the resource allocation projection.

The process concludes at block 205, where the system transmits the resource allocation projection to the user computing device. Typically, the resource allocation projection will be transmitted through a network to a mobile device of the user (e.g., the mobile phone which provided the location data used to generate the predicted action). The system may provide the resource allocation projection to the user in real-time such that the user may refer to the resource allocation projection as the user is in the process of completing the first action. For instance, if the user is able to access information about financial impact and terms as the user is in the process of the vehicle purchase process, the user may be able to perform real-time decisioning based on the information provided therein. By using the system as described above, the user may optimize the allocation of resources to accomplish the user's objectives and/or life events throughout the user's lifetime.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 16/267,518 | SYSTEM FOR ASSESSING AND PRIORITIZING REAL TIME RESOUCE REQUIREMENTS | Concurrently herewith |
| 16/267,519 | SYSTEM FOR RESOURCE REQUIREMENTS AGGREGATION AND CATEGORIZATION | Concurrently herewith |
| 16/268,062 | SYSTEM FOR SMART CONTRACT DEPENDENT RESOURCE TRANSFER | Concurrently herewith |
| 16/267,521 | SYSTEM FOR REAL-TIME TRANSMISSION OF DATA ASSOCIATED WITH TRIGGER EVENTS | Concurrently herewith |
| 16/267,745 | NAVIGATION SYSTEM FOR MANAGING UTILIZATION OF RESOURCES | Concurrently herewith |

What is claimed is:
1. A system for real time provisioning of resources based on condition monitoring, the system comprising:
 a memory device with computer-readable program code stored thereon;
 a communication device; and
 a processing device operatively coupled to the memory device and the communication device, wherein the processing device is configured to execute the computer-readable program code to:

continuously collect, via a data analytics engine, user data associated with a user from a user computing device;

construct a user profile associated with the user based on the user data;

predict, via a predictive engine, that a user intends to take a first action based on historical location data associated with the user, real-time location data associated with the user, and Internet browsing data associated with the user;

based on the user profile, perform a validation check of the first action, wherein the validation check comprises verifying that the user meets one or more requirements to take the first action;

based on the performing the validation check, determine that the user profile is consistent with the first action;

generate a resource allocation projection associated with the first action; and transmit the resource allocation projection to the user computing device.

2. The system according to claim 1, wherein generating the resource allocation projection further comprises:

transmitting the user profile to one or more third party computing devices;

receiving, from the one or more third party computing devices, additional data associated with the first action; and incorporating the additional data into the resource allocation projection.

3. The system according to claim 1, wherein the processing device is further configured to execute the computer-readable program code to:

detect that the validation check has succeeded; and increase a confidence level that the user intends to take the first action.

4. The system according to claim 1, wherein the processing device is further configured to execute the computer-readable program code to adjust predictions based on machine learning.

5. The system according to claim 1, wherein the user data comprises behavior data, historical data, and device data.

6. A computer program product for real time provisioning of resources based on condition monitoring, the computer program product comprising at least one non-transitory computer readable medium having computer-readable program code portions embodied therein, the computer-readable program code portions comprising executable code portions for:

continuously collecting, via a data analytics engine, user data associated with a user from a user computing device;

constructing a user profile associated with the user based on the user data;

predicting, via a predictive engine, that a user intends to take a first action based on historical location data associated with the user, real-time location data associated with the user, and Internet browsing data associated with the user;

based on the user profile, performing a validation check of the first action, wherein the validation check comprises verifying that the user meets one or more requirements to take the first action;

based on the performing the validation check, determining that the user profile is consistent with the first action;

generating a resource allocation projection associated with the first action; and transmitting the resource allocation projection to the user computing device.

7. The computer program product of claim 6, wherein generating the resource allocation projection further comprises:

transmitting the user profile to one or more third party computing devices;

receiving, from the one or more third party computing devices, additional data associated with the first action; and incorporating the additional data into the resource allocation projection.

8. The computer program product of claim 6, the computer-readable program code portions further comprising executable code portions for:

detecting that the validation check has succeeded; and increasing a confidence level that the user intends to take the first action.

9. The computer program product of claim 6, wherein the user data comprises behavior data, historical data, and device data.

10. A computer-implemented method for real time provisioning of resources based on condition monitoring, the method comprising:

continuously collecting, via a data analytics engine, user data associated with a user from a user computing device;

constructing a user profile associated with the user based on the user data;

predicting, via a predictive engine, that a user intends to take a first action based on historical location data associated with the user, real-time location data associated with the user, and Internet browsing data associated with the user;

based on the user profile, performing a validation check of the first action, wherein the validation check comprises verifying that the user meets one or more requirements to take the first action;

based on the performing the validation check, determining that the user profile is consistent with the first action;

generating a resource allocation projection associated with the first action; and transmitting the resource allocation projection to the user computing device.

11. The computer-implemented method of claim 10, wherein generating the resource allocation projection further comprises:

transmitting the user profile to one or more third party computing devices;

receiving, from the one or more third party computing devices, additional data associated with the first action; and incorporating the additional data into the resource allocation projection.

12. The computer-implemented method of claim 10, the method further comprising:

detecting that the validation check has succeeded; and increasing a confidence level that the user intends to take the first action.

13. The computer-implemented method of claim 10, the method further comprising adjusting predictions based on machine learning.

14. The computer-implemented method of claim 10, wherein the user data comprises behavior data, historical data, and device data.

\* \* \* \* \*